United States Patent [19]

Sugibuchi

[11] Patent Number: 4,570,477
[45] Date of Patent: Feb. 18, 1986

[54] LEAK DETECTING CABLE

[75] Inventor: Hiroyuki Sugibuchi, Hoya, Japan

[73] Assignee: Junkosha Company Ltd., Tokyo, Japan

[21] Appl. No.: 574,371

[22] Filed: Jan. 27, 1984

[30] Foreign Application Priority Data

Mar. 10, 1983 [JP] Japan .............................. 58-34500[U]

[51] Int. Cl.⁴ ............................................ G01M 3/16
[52] U.S. Cl. ............................... 73/40.5 R; 73/304 R;
174/11 R; 174/115; 200/61.04
[58] Field of Search ........................ 73/40.5 R, 304 R;
174/36, 115, 11 R; 333/243; 340/605, 620;
200/61.04

[56] References Cited

U.S. PATENT DOCUMENTS

| | | | |
|---|---|---|---|
| 3,564,526 | 2/1971 | Butts | 340/605 X |
| 3,728,474 | 4/1973 | Arnaudin | 174/115 |
| 3,763,306 | 10/1973 | Marshall | 174/115 |
| 3,934,075 | 1/1976 | Dilliplane | 333/243 X |
| 4,029,889 | 6/1977 | Mizuochi | 340/605 X |
| 4,169,377 | 10/1979 | Scheib | 73/304 R |
| 4,206,632 | 6/1980 | Suzuki | 73/40.5 R |
| 4,469,539 | 9/1984 | Wade et al. | 174/115 X |

Primary Examiner—Charles Hart
Attorney, Agent, or Firm—Mortenson & Uebler

[57] ABSTRACT

A liquid leak detecting sensor in cable form is provided wherein an element of the cable is a material which is easily deformable and which, on deformation, maintains the cable in the deformed configuration.

2 Claims, 5 Drawing Figures

LEAK DETECTING CABLE

BACKGROUND OF THE INVENTION

This device relates to a liquid detection sensor.

Liquid detection sensors are used to detect leakage of liquids or determine liquid levels. The liquid detectors used for this purpose include, for example, a leakage detection cable which acts as a cable type of liquid detection sensor, and a flat conductive liquid detection sensor. In a standard leakage detection cable, pulse signals are transmitted to a pair of coaxially-arranged conductors and any variation in the characteristic impedance therebetween is measured to thereby determine the leakage of liquid. Reflection or absorption of pulse signals can be measured to thereby determine a liquid level.

In a standard conductive liquid detection sensor, a voltage is applied between a plurality of conductors. Any variation in the impedance therebetween is measured (as a check on the elecrical condition of the conductors) to thereby ascertain the leakage of liquid, or the liquid level.

The transportation of liquids such as crude oil, petroleum, gasoline and kerosene, and of salts such as sulfuric acid and hydrochloric acid, from one position to another, is often done through underground pipelines, as necessary. Transporting liquids in this manner raises the problem of leakage thereof from the piping and valves.

Various systems for detecting the leakage of liquids have been proposed. They include leakage detection cables, one type of liquid detection sensors in which a cable is laid along a pipeline carrying liquid. A conductive liquid detection sensor can also be laid in the same manner on various portions of apparatus, machinery, pipes and valves, at which leakage of liquids tend to occur, or at which liquid levels are detected, to check for the leakage of liquid therefrom or determine the liquid level.

However, such conventional liquid detection sensors generally have shapes that bear no relationship to those of the containers holding the liquids being detected, such as pipelines and valves. Accordingly, it is difficult to mount these liquid detection sensors on these pipelines and valves so that they are kept in close contact therewith. Special attachment means are additionally often required. Even when such liquid detection sensors are mounted along pipelines and valves, the leakage of liquid cannot always be detected accurately because the detection sensors cannot always be mounted on suitable portions of the pipes and valves in a suitable manner.

Furthermore, in detecting certain kinds of liquid, it is necessary that corrosion-resistant attachment means are used for the liquid detection sensors, and that special care is taken.

An object of the device of this invention is to eliminate the problems encountered in conventional techniques in this field, and provide a liquid detection sensor which can be permanently deformed so that it can be suitably mounted on the container of the liquid being detected, such as a pipe or valve, and which is capable of detecting the leakage of liquid reliably.

SUMMARY OF THE INVENTION

A liquid detection sensor is provided having an elongated body, the liquid detection sensor being provided with at least one plastically and permanently deformable member extending along at least a portion of its longitudinal direction. The elongated sensor body comprises a coaxial cable having a protective covering layer over the outer circumferential surface thereof, the plastically deformable member comprising a linear metallic member provided within the protective covering layer. A plurality of deformable members may be employed, and they are preferably made of metallic lead.

DETAILED DESCRIPTION OF THE INVENTION AND PREFERRED EMBODIMENTS WITH REFERENCE TO THE DRAWINGS

A liquid leak detecting sensor in cable form is provided wherein an element of the cable is a material which is easily deformable and which, on deformation, maintains the cable in the deformed configuration.

The gist of this device resides in a liquid detection sensor having an elongated sensor body characterized in that the liquid detector is provided with a plastically deformable member extending in its longitudinal direction, the liquid detection sensor being capable of deforming plastically and permanently so that it can be mounted on a liquid-carrying vessel or a liquid storage vessel in accordance with the arrangement and shape of the vessel. The liquid detection sensor mounted in such a manner enables the detection of any leakage of liquid, or the liquid level in such a vessel, to be carried out accurately.

The liquid detection sensor of this application comprises an elongated liquid detection sensor body, and plastically deformable members extending in the longitudinal direction of the liquid detection sensor body.

When a liquid detection sensor is formed in this manner, the plastically deformable members can be bent in accordance with the shape of the container of the liquid, or wound therearound, as around a pipe, so that the liquid detection sensor can be permanently mounted in a suitable form on a suitable portion of the container. Therefore, this device requires no attachment means when mounting it on a container, and is capable of detecting any leakage of liquid reliably.

Embodiments of this device will be described with reference to the drawings.

Figure 1:
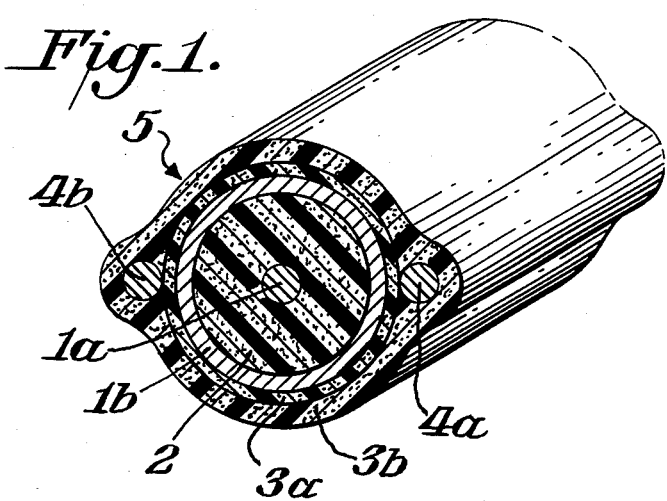
FIG. 1 shows a cross-sectional view of one embodiment of the invention in the form of a leak detecting cable.

FIG. 1 is a schematic cross-section of a leakage detection cable according to this invention.

Reference numeral 5 denotes elongated leakage detection cable, and 1a, 1b inner and outer conductors arranged so as to be in a substantially coaxial and parallel relationship. The inner conductor 1a consists of a linear, solid body, and the outer conductor 1b a cylindrical reticulate body.

An insulating layer 2, preferably braided, consists of a fluororesin such as polytetrafluoroethylene, provided between the inner and outer conductors 1a, 1b. The outer circumferential surface of the outer conductor 1b is covered with an outer protective covering layer 3 of a porous material. The outer protective covering layer 3 consists of a first sub-layer 3a covering the outer circumferential surface of the outer conductor 1b, and a second sub-layer 3b covering the outer circumferential surface of the first sub-layer 3a. Two linear metallic members 4a, 4b of metallic lead or an alloy thereof are embedded in portions of the cable 5 which are between the first and second sub-layers 3a, 3b and are symmetrical about the inner conductor 1a. These metallic members are a key to this invention.

Figure 2:
FIG. 2 shows the leak detecting cable of FIG. 1 mounted on a pipeline through which liquid is transported.

The leakage detection cable 5 can be mounted in close contact with the outer circumferential surface of a pipeline 6 by winding it therearound, for example, as shown in FIG. 2, without the need of any special attachment means. In this leakage detection cable 5, because the diameter of the linear metallic members 4a, 4b will not increase the overall dimensions of the cable unduly, a plurality of linear metallic members 4a, 4b can improve the adaptability of the cable 5. FIG. 2 shows one example of how the leakage detection cable 5 can be used.

An example of a method of manufacturing the leakage detection cable 5 will now be described. The insulating layer 2 is formed by braiding over the inner conductor 1a, and the outer conductor 1b, which has been formed by a similar braiding method, is then fitted around the outer circumferential surface of the insulating layer 2. The outer circumferential surface of the outer conductor 1b is then covered with a layer (the first sub-layer 3a) consisting, for example, of a thin layer of porous polytetrafluoroethylene or a layer of braided yarn. The two linear metallic members 4a, 4b are arranged at cross-sectionally symmetrical positions on top of the layer 3a. Another layer (the second sub-layer 3b) consisting of a thin layer of porous polytetrafluoroethylene or a layer of braided yarn is then formed over the outside of the metallic members 4a, 4b to form the outer protective covering layer 3, completing the leakage detection cable 5 of FIG. 1.

The insulating layer 2 is preferably made of a material with a low relative permittivity and a small dielectric loss. Teflon, polypropylene, polyethylene, and various other similar materials can be used.

Figure 3:
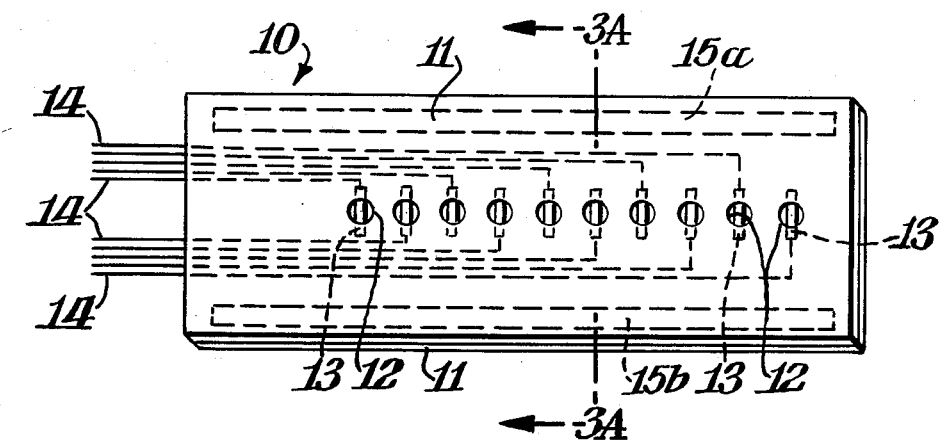
FIG. 3 shows an alternate embodiment of the invention in the form of a flat, conductive liquid detection sensor.

FIG. 3 is an external view of a conductive liquid detection sensor, to which the techniques according to the device in this application are applied.

Reference number 10 denotes a conductive liquid detection sensor provided with a plurality of regularly-spaced detection electrodes 13, and a plurality of lead wires 14 corresponding to the electrodes 13. The electrodes 13 and lead wires 14 are sandwiched or embedded between upper and lower layers 11 of fluoroplastic film which have a plurality of regularly-spaced through openings 12. The detection electrodes 13 are aligned with the openings 12 so that they are exposed.

The lead wires 14 are arranged so that they are connected to the corresponding electrodes 13 and taken out in opposite directions alternately. Linear metallic members 15a, 15b, preferably metallic lead, which extend on either side of the outermost portions of the lead wires 14, parallel to the direction in which the lead wires 14 extend, are also sandwiched and embedded between the upper and lower layers 11 of fluoroplastic film.

Figure 3A:
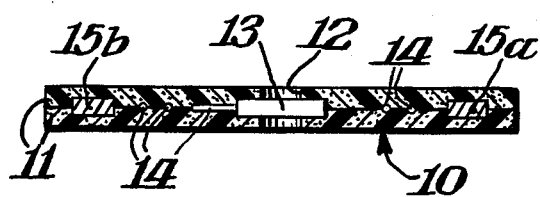
FIG. 3A shows a cross-sectional view of the sensor of FIG. 3 taken along the line 3A—3A thereof.

FIG. 3A shows the sensor of FIG. 3 in cross-section, taken along line 3A—3A of FIG. 3.

Figure 4:
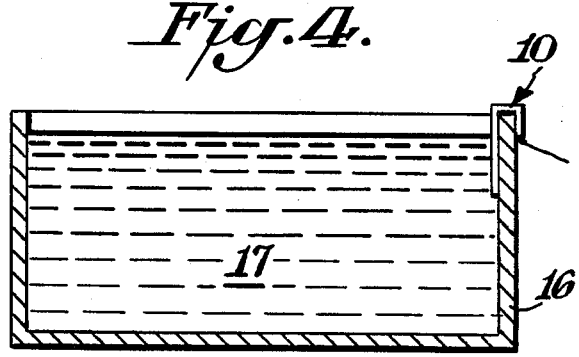
FIG. 4 shows the sensor of FIG. 3 mounted on the side of a tank used for storing liquid.

If the conductive liquid detection sensor 10 is made longer, it can be used in the same manner as the embodiment of FIG. 2. It can also be bent and hung onto a side wall of a liquid vessel 16, as shown in FIG. 4, to detect the level of liquid 17, or this liquid detection sensor 10 can be bent and mounted on an outer wall of a valve or vessel. FIG. 4 shows one example of how the conductive liquid detection sensor 10 can be used.

An example of a method of manufacturing the conductive liquid detection sensor 10 of FIG. 3 will now be described. The plurality of electrodes 13, with the lead wires 14 connected, are set on, for example, the lower layer 11 of fluoroplastic film provided with through openings 12, in such a manner that the electrodes 13 are aligned with the openings 12. The linear metallic members 15a, 15b are then set on portions of the layer 11 which are outside the outermost portions of the wires 14. The upper layer 11 of fluoroplastic film is then laid over the resultant assembly to obtain a laminated assembly. This laminate is then held between pressure rolls and rolled in such a manner that all the members of the laminate are joined together under pressure. The resultant assembly is heat-treated to provide the sensor illustrated in FIG. 3.

In the above embodiments, the linear metallic members 4a, 4b or 15a, 15b are examples of the plastically deformable members used in the device of this application. The leakage detection cable 5 or conductive liquid detection sensor 10 are adapted to be deformable plastically in the direction in which the linear metallic members 4a, 4b or 15a, 15b are bent.

As described in detail above, metallic members are used as the plastically deformable members in these embodiments. The deformable members are not strictly limited to metallic members; they may be made of any material which can be plastically deformed. Although a total of two linear metallic members are provided at either side of the sensors of these embodiments, any number of such metallic members may be provided. These metallic members need not consist of single wires; they can each be divided into a plurality of pieces embedded in the liquid detection sensor body. In short, it can be said that it is only necessary to provide the plastically deformable members in the portions of the liquid detection sensor body which will be bent.

These linear metallic members can be formed in various shapes depending upon the shape of the liquid container to which they are applied. Namely, they can be formed so as to have a circular or square cross section. Basically flat metallic members, two-ply metallic members and various other types of metallic members can also be employed.

In the embodiment shown in FIG. 1, plastically deformable members are provided in its outer protective covering layer 3; they can also be provided in an inner insulating layer. The outer covering layer 3 is divided into first and second sub-layers 3a, 3b; these may, of course, be formed integrally at the same time. The linear metallic members may be provided in contact with the inner and outer conductors 1a, 1b, but care should be taken to prevent the characteristic impedance between the conductors being adversely affected.

Similarly, in the embodiment of FIG. 3, linear metallic members are provided outside of the outermost portions of the lead wires, and the combination of the metallic members, lead wires, and electrodes connected to the lead wires are sandwiched and embedded between the upper and lower layers 11 of fluoroplastic film. The construction of this device is not limited to that described above; for example metallic members of a larger width can be provided on the upper or lower surface of one layer 11 of fluoroplastic film in such a manner that the metallic members cover the lead wires, and the metallic member-supporting surface is then covered with another film layer.

The materials used and the arrangement of parts of these are given as examples. Since the gist of this device resides in the provision of plastically deformable members, the materials used and the construction of this device are not, of course, limited to those specified for the embodiments. Namely, the techniques included in this device can be applied to a flat liquid detection sensor, a cable type of liquid detection sensor, and any other type of liquid detection sensor provided that it has an elongated body.

As may be understood from the above description, this device is directed to a liquid detection sensor with an elongated body, characterized in that the liquid detection sensor is provided with plastically deformable members extending in the longitudinal direction thereof. The device is therefore capable of being mounted on a liquid transportation container or a liquid storage container by being deformed plastically in accordance with the arrangement and shape of the container, and applied thereto in close contact therewith. Thus, this device can be deformed to conform with the shape of a container for a liquid and mounted thereon stably, without the use of any special attachment means.

Accordingly, detection of any leakage of liquid, or a liquid level, can be carried out reliably.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. A liquid detection sensor having an elongated body comprising inner and outer conductors arranged so as to be in a substantially coaxial and parallel relationship, said inner conductor being a linear solid body and said outer conductor being a cylindrical reticulate body, and having an insulating layer of a fluororesin provided between said inner and outer conductors, the outer circumferential surface of said outer conductor being covered with an outer protective covering layer of a porous material, the outer protective covering layer comprising a first sub-layer covering the outer circumferential surface of said outer conductor and a second sub-layer covering the outer circumferential surface of said first sub-layer, and having at least one linear metallic plastically and permanently deformable member of metallic lead or an alloy thereof embedded in said sensor between said first and said second sub-layers, extending along at least a portion of said body's longitudinal direction.

2. The sensor of claim 1 having a plurality of said deformable members.

* * * * *